United States Patent
Matsukawa et al.

(10) Patent No.: US 7,236,088 B2
(45) Date of Patent: Jun. 26, 2007

(54) DEVICE FOR DETECTING OBSTACLE LOCATED BACKWARD OF AUTOMOBILE

(75) Inventors: Norifumi Matsukawa, Kariya (JP); Yoshihisa Sato, Nagoya (JP); Koji Kato, Aichi-gun (JP)

(73) Assignee: DENSO Corporation, Kariya (JP)

( * ) Notice: Subject to any disclaimer, the term of this patent is extended or adjusted under 35 U.S.C. 154(b) by 184 days.

(21) Appl. No.: 11/100,606

(22) Filed: Apr. 7, 2005

(65) Prior Publication Data
US 2005/0237168 A1 Oct. 27, 2005

(30) Foreign Application Priority Data
Apr. 7, 2004 (JP) .............................. 2004-113280

(51) Int. Cl.
*B60Q 1/00* (2006.01)

(52) U.S. Cl. ........................................ 340/435; 367/93

(58) Field of Classification Search ................ 340/435, 340/901, 932.2, 552; 367/93, 94
See application file for complete search history.

(56) References Cited

U.S. PATENT DOCUMENTS

| 6,676,186 B2 * | 1/2004 | Greif ............................ 296/50 |
| 6,879,914 B2 * | 4/2005 | Hoenes et al. .............. 340/435 |
| 2003/0052969 A1 | 3/2003 | Satoh et al. |

FOREIGN PATENT DOCUMENTS

| JP | A-2002-323560 | 11/2002 |
| JP | A-2002372585 | 12/2002 |

* cited by examiner

*Primary Examiner*—Thomas Mullen
(74) *Attorney, Agent, or Firm*—Posz Law Group, PLC

(57) ABSTRACT

A device for detecting an obstacle located backward of a vehicle is mounted on a vehicle such as a pickup truck having a rear loading space and a tailgate for closing the loading space. Ultrasonic waves are transmitted backward, and the backward obstacle is detected by receiving ultrasonic waves reflected by the backward obstacle. When the tailgate is open or the load extends backward from the open tailgate, the transmitted waves are reflected by the open tailgate or the extending load. This may cause erroneous detection of the backward obstacle. To avoid the erroneous detection, detection of the reflected waves from the backward obstacle is delayed by a predetermined period when the tailgate is open or the load extends backward.

6 Claims, 7 Drawing Sheets

DEVICE FOR DETECTING OBSTACLE LOCATED BACKWARD OF AUTOMOBILE

CROSS-REFERENCE TO RELATED APPLICATION

This application is based upon and claims benefit of priority of Japanese Patent Application No. 2004-113280 filed on Apr. 7, 2004, the content of which is incorporated herein by reference.

BACKGROUND OF THE INVENTION

1. Field of the Invention

The present invention relates to a device for detecting an obstacle located backward of an automotive vehicle, especially, a vehicle such as a pickup truck.

2. Description of Related Art

Examples of a device for detecting obstacles located around an automobile are disclosed in JP-A-2002-323560 and JP-A-2002-372585. In such a device, ultrasonic waves are transmitted from an on-board transmitter toward obstacles, and obstacles are detected by receiving waves reflected by the obstacles. When the obstacles are detected, a driver is notified by a buzzer or the like.

When this type of a transmitter is mounted on a vehicle such as a pickup truck that has a loading space at a rear side of the vehicle and a tailgate for closing the loading space, the transmitted ultrasonic waves will be reflected by the tailgate if the tailgate is open. This may lead erroneous detection of the backward obstacles. This situation often occurs when the vehicle is driven backward while keeping the tailgate open for loading goods on the loading space. It is also known to use electromagnetic waves such as infrared waves for this purpose in place of the ultrasonic waves. The same problem is involved when the electromagnetic waves are used for detecting the obstacles.

SUMMARY OF THE INVENTION

The present invention has been made in view of the above-mentioned problem, and an object of the present invention is to provide an improved device for detecting obstacles located backward of an automobile such as a pickup truck having a tailgate, wherein the backward obstacles are surely detected irrespective of whether the tail gate is open or not.

The obstacle-detecting device includes an ultrasonic wave transmitter-receiver, a control unit for controlling operation of the transmitter-receiver, and devices for informing a driver of a backward obstacle when it is detected. The transmitter-receiver is mounted on a rear bumper of a vehicle such as a pickup truck that has a loading space at the rear side and a tailgate for closing the loading space. Ultrasonic waves are transmitted backward from the transmitter-receiver, and the ultrasonic waves reflected by an obstacle located backward of the vehicle are received by the transmitter-receiver. When a level of the reflected waves is higher than a predetermined level, it is determined that the obstacle is actually located backward of the vehicle. When such an obstacle is detected, the informing devices such as a buzzer and a display notify the driver of that fact.

When the tailgate is open, the ultrasonic waves will be reflected by the open tailgate. The ultrasonic waves reflected by the open tailgate erroneously represent presence of a backward obstacle. To avoid the erroneous detection of the obstacle, a tailgate sensor for detecting whether the tailgate is open or closed is included in the obstacle-detecting device. When the tailgate is open, detection of the backward obstacle is initiated after the reflected waves from the open tailgate have been all received. This means that the backward obstacle is detected after the waves reflected by the open tailgate are all disappeared. In other words, timing for starting obstacle-detection is delayed for a predetermined period when the tailgate is open.

The tailgate sensor may be a switch device that is turned on when the tailgate is open and turned off when the tailgate is closed. Alternatively, the tailgate position may be detected by comparing a waveform of the reflected waves with a standard waveform representing the open tailgate. In this case, the tailgate sensor can be eliminated. To cope with the situation where part of the load extends backward from the rear-most end of the open tailgate and transmitted waves are reflected by the extending load, the obstacle-detection starting time may be further delayed when the extending load is detected. The extending load may be detected by comparing a waveform of the reflected waves with a standard waveform representing the extending load. In place of the ultrasonic waves, other electromagnetic waves may be used for detecting the obstacle.

According to the present invention, erroneous detection of the backward obstacle due to the reflection from the open tailgate or the extending load is avoided in a simple manner. Other objects and features of the present invention will become more readily apparent from a better understanding of the preferred embodiments described below with reference to the following drawings.

BRIEF DESCRIPTION OF THE DRAWINGS

FIG. 5B (lower half) is a graph showing an accumulated difference between sampled data and a standard data in the waves reflected by the tailgate;

DETAILED DESCRIPTION OF THE PREFERRED EMBODIMENTS

Figure 1:
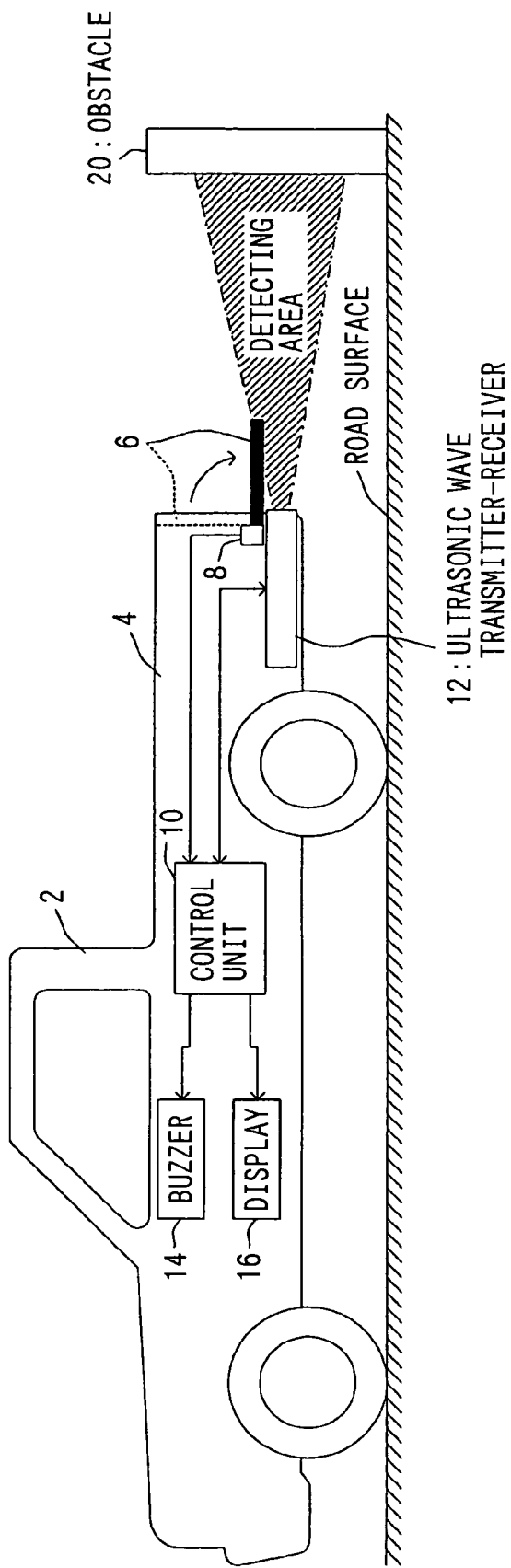
FIG. 1 is a side view showing a pickup truck on which an obstacle-detecting device according to the present invention is mounted.
Figure 2:
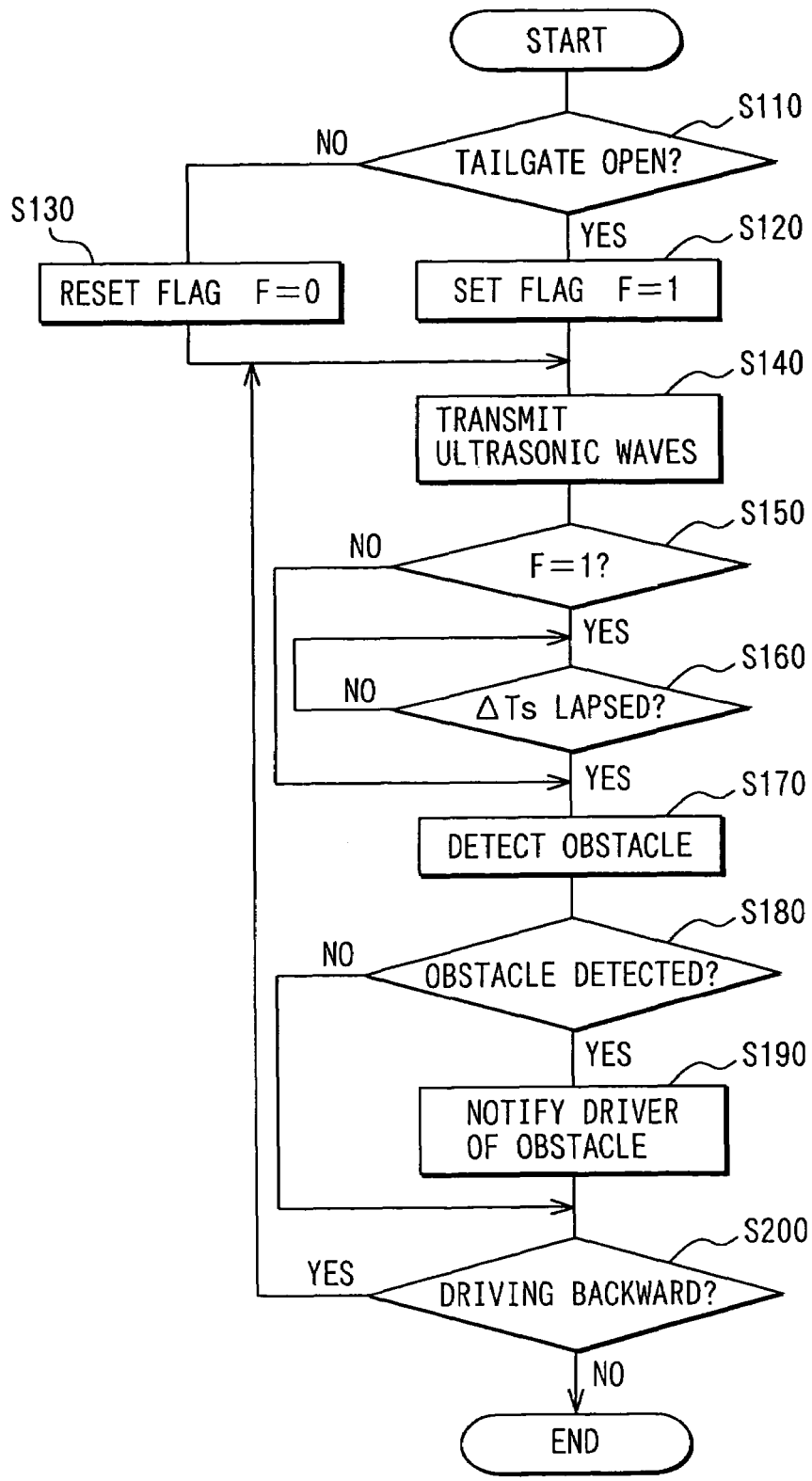
FIG. 2 is a flowchart showing a process of detecting a backward obstacle as a first embodiment of the present invention.
Figure 3:
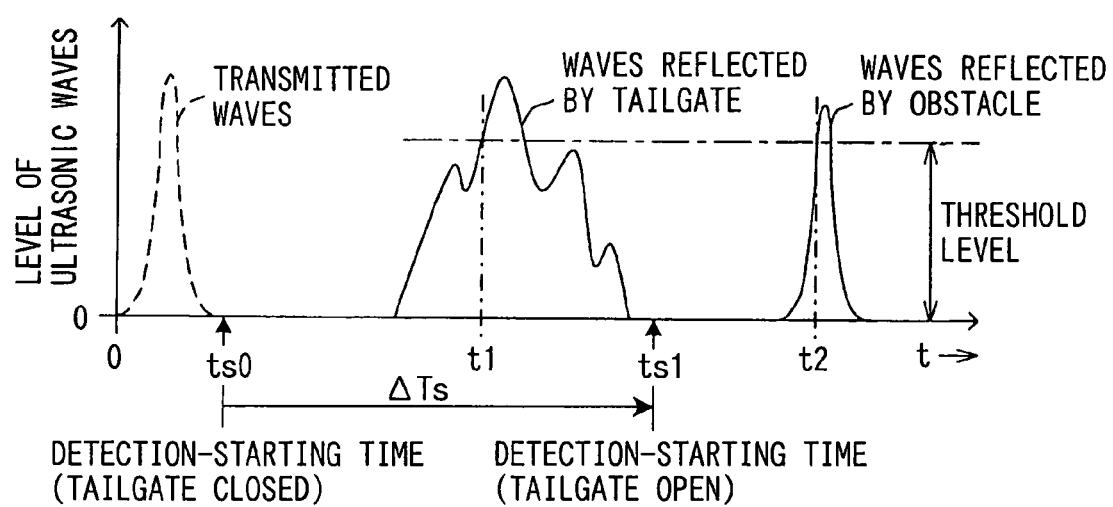
FIG. 3 is a timing chart showing transmitted waves and reflected waves from a tailgate and a backward obstacle in the detecting process shown in FIG. 2.

A first embodiment of the present invention will be described with reference to FIGS. 1–3. An obstacle-detecting device of the present invention is mounted on a pickup truck 2 that has a loading space 4 and a tailgate 6 for closing the loading space. When loading goods on the loading space 4, the tailgate 6 is opened as shown in FIG. 1, and it is usually closed when the vehicle is driven. It is also possible that the vehicle is slowly driven backward to approach a position for loading while the tailgate 6 is kept open.

The obstacle-detecting device is composed of: a tailgate sensor 8 for detecting whether the tailgate 6 is open or closed; an ultrasonic transmitter-receiver 12 for emitting the ultrasonic waves backward and for receiving the waves reflected by the obstacle 20; a buzzer 14 and a display 16 for notifying a driver when the obstacle 20 is detected; and a control unit 10 for controlling the transmitter-receiver 12, the buzzer 14 and the display 16. The tailgate sensor 8 is a switch that is turned on when the tailgate 6 is opened and is turned off when the tailgate 6 is closed. The ultrasonic transmitter-receiver 12 transmits ultrasonic waves backward and receives the waves reflected by the backward obstacle 20. The ultrasonic transmitter-receiver 12 is mounted in a rear bumper.

The control unit 10 is composed of a microcomputer including CPU, ROM and RAM. The control unit 10 includes a circuit for driving a transmitter in the transmitter-receiver 12, an input circuit for inputting the reflected waves received by a receiver in the transmitter-receiver 12, and a circuit for driving the buzzer 14 and the display 16. The control unit 10 carries out a process of detecting the obstacle shown in FIG. 2.

The process of detecting the obstacle located backward of the automobile will be described with reference to FIG. 2. The process starts when a transmission gear is shifted to a backward gear, i.e., when the vehicle is ready to be driven backward. The process is repeated until the transmission gear is shifted to a neutral position or to a forward gear. At step S110, whether the tailgate 6 is open or closed is detected using the tailgate sensor 8. If the tailgate 6 is open, the process proceeds to step S120, where a flag is set (Flag=1). If the tailgate 6 is closed, the process proceeds to step S130, where the flag is reset (Flag=0). At the next step S140, the transmitter-receiver 12 is driven so that ultrasonic waves are transmitted backward toward the obstacle 20.

At step S150, it is checked whether the flag is set or not. If the flag is set, i.e., if the tailgate 6 is open, the process proceeds to step S160, where whether a predetermined delay period $\Delta Ts$ (explained later in detail) has lapsed or not is checked. The process stays there until the predetermined delay period $\Delta Ts$ lapses and then proceeds to step S170 after $\Delta Ts$ has lapsed. If the flag is not set, i.e., if the tailgate 6 is closed, the process directly proceeds from step S150 to step S170. At step S170, a level of reflected waves received by the transmitter-receiver 12 is compared with a threshold level. If the level of the reflected waves is higher than the threshold level, it is determined that there exists a backward obstacle. Further, a distance between the vehicle and the obstacle is calculated based on a period of time consumed after transmission of the ultrasonic waves until the reflected waves are received. The obstacle-detecting step S170 is performed for a predetermined period required for detecting the obstacle 20 located in a predetermined detecting area.

Then, at step S180, whether the obstacle 20 is detected or not is determined. If the obstacle is detected, the process proceeds to step S190, where the buzzer 14 is driven to notify the driver that the backward obstacle exists. Further, the distance between the vehicle and the obstacle is displayed on the display 16. Then, the process proceeds to step S200. If it is determined that the obstacle is not detected at step S180, the process directly proceeds to step S200. At S200, it is checked whether the transmission is shifted to positions other than the backward position, i.e., whether the vehicle is still driven backward or ready to be driven backward. If the transmission is not shifted to positions other than the backward position, the process returns to step S140 to repeat above-explained steps. If the transmission is shifted to other positions, the process of detecting the backward obstacle comes to the end.

As explained above, whether the tailgate 6 is open or closed is first detected when the vehicle is driven backward. If the tailgate 6 is closed, the obstacle-detection is performed immediately after the ultrasonic waves are transmitted. If the tailgate 6 is opened, the obstacle-detection is performed after the predetermined delay period $\Delta Ts$ has lapsed. In this manner, it is avoided that a presence of the obstacle is erroneously detected based on the waves reflected by the open tailgate 6. As shown in FIG. 1, when the tailgate 6 is closed, there is no chance for the transmitted waves to be reflected by the tailgate 6. When the tailgate 6 is opened, the transmitted waves are first reflected by the tailgate 6 and then by the obstacle 20. Therefore, when the tailgate 6 is opened, the erroneous detection of the obstacle is avoided by starting the obstacle detection after the delay time $\Delta Ts$ has lapsed.

The timing of the obstacle detection will be further explained with reference to FIG. 3. Transmission of the ultrasonic waves is terminated at ts0. The waves reflected by the tailgate 6 (when it is open) are received soon after the waves are transmitted. The level of the waves reflected by the tailgate 6 exceeds the threshold level at time t1. Then, the waves reflected by the obstacle 20 are received, and their level exceeds the threshold level at time t2. On the other hand, when the tailgate 6 is closed, there is no reflection from the tailgate 6. To avoid the erroneous detection of the obstacle 20 based on the waves reflected by the tailgate 6, a detection-starting time ts1, when the tailgate 6 is open, is delayed by the predetermined delay time $\Delta Ts$ from a detection-starting time ts0 which is applicable when the tailgate 6 is closed. In other words, the obstacle detection starts at ts0 when the tailgate 6 is closed, while it starts at ts1 when the tailgate 6 is open. A period between ts0 and ts1 is the predetermined delay period $\Delta Ts$.

Figure 4:
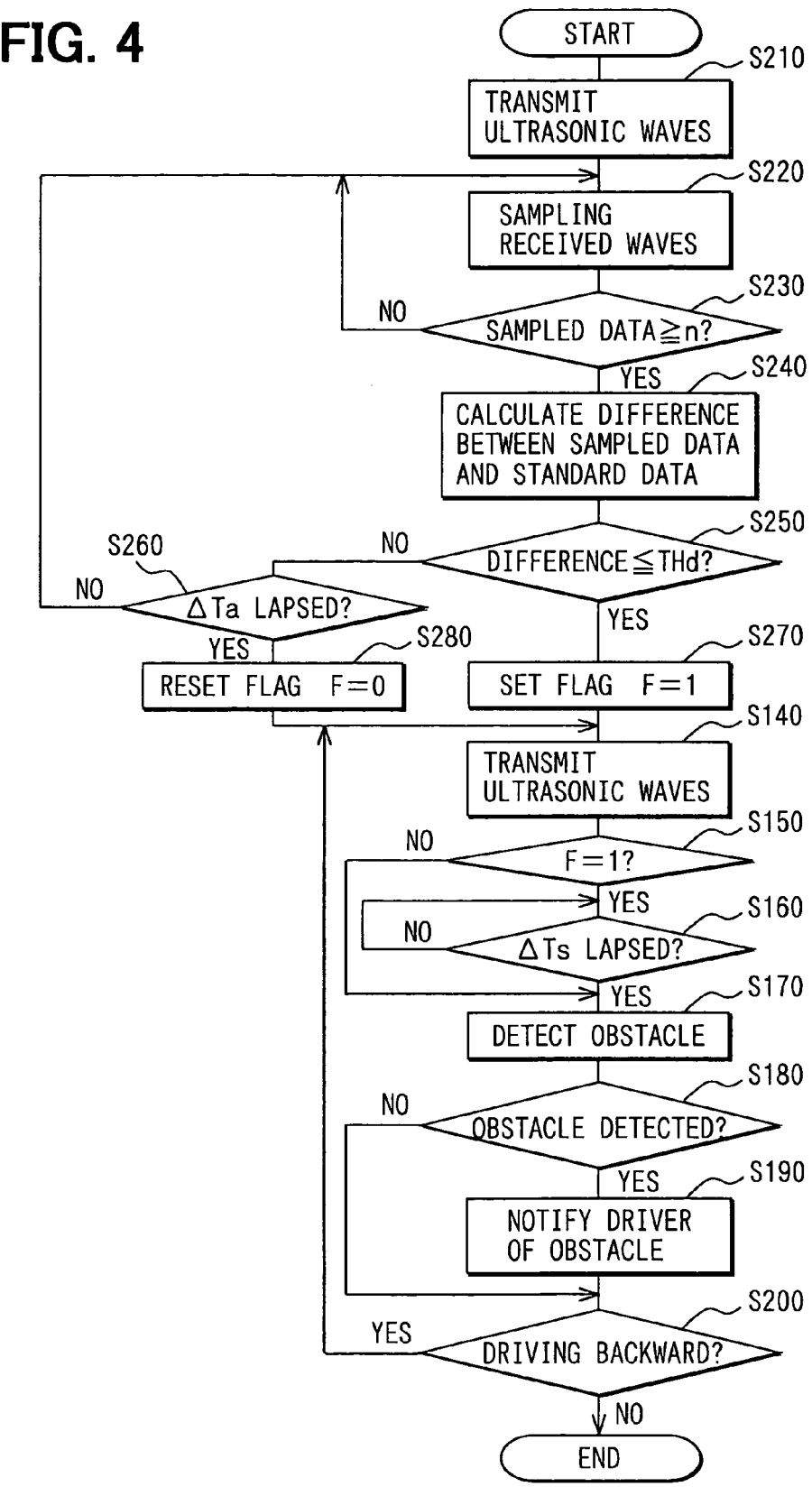
FIG. 4 is a flowchart showing a process of detecting a backward obstacle as a second embodiment of the present invention.
Figure 5A:
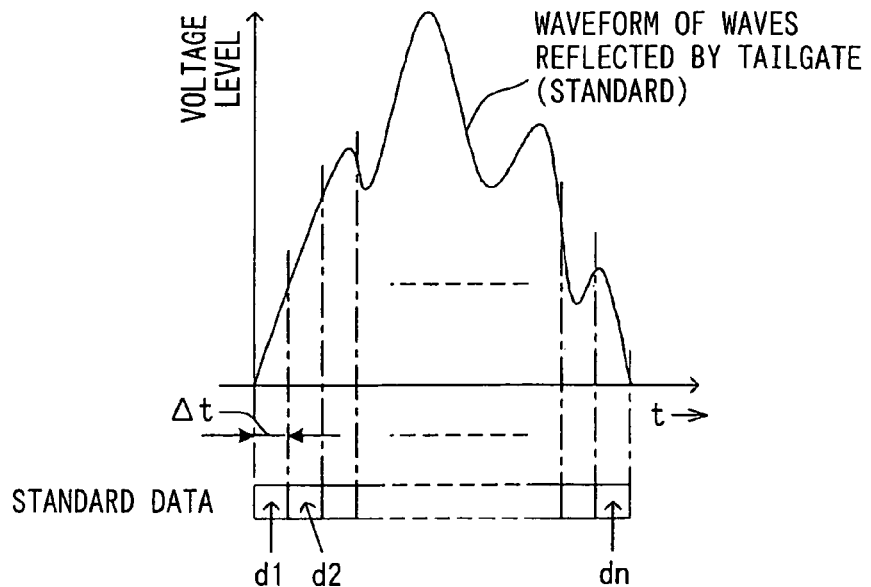
FIG. 5A is a graph showing a standard waveform of waves reflected by an open tailgate.
Figure 5B:
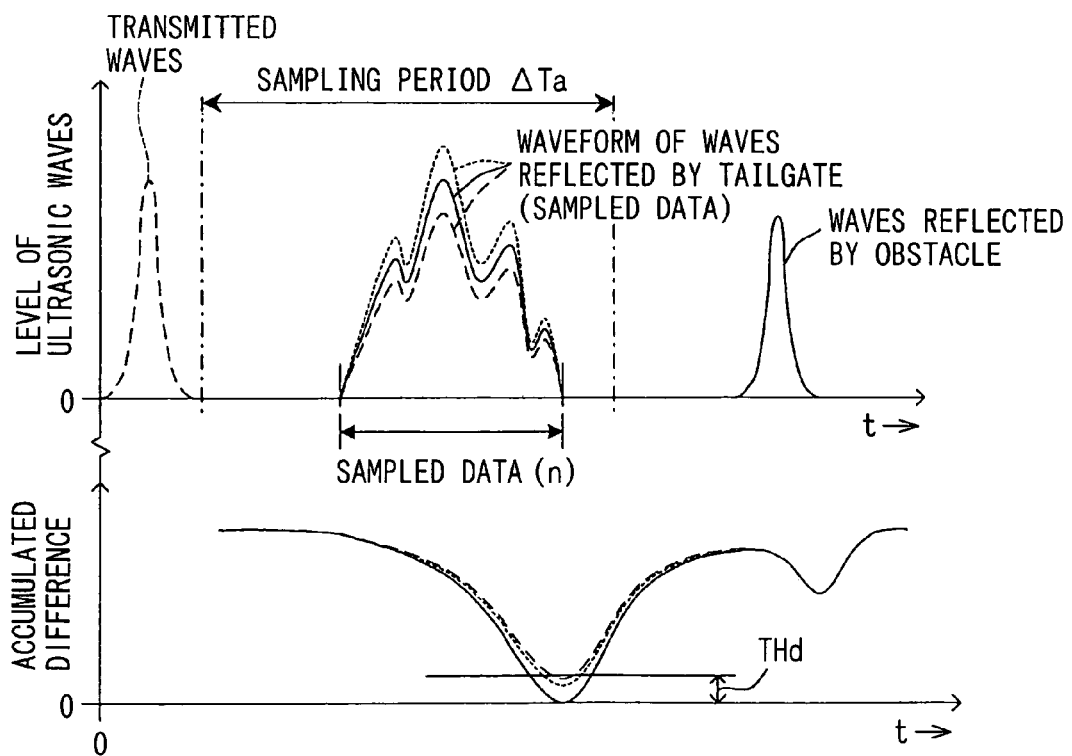
FIG. 5B (upper half) is a timing chart showing transmitted waves and reflected waves from an open tailgate and a backward obstacle in the detecting process shown in FIG. 4.

A second embodiment of the present invention will be described with reference to FIGS. 4, 5A and 5B. In this embodiment, the tailgate sensor 8 shown in FIG. 1 is eliminated, but other structures are the same as those of the first embodiment. Whether the tailgate 6 is opened or closed is determined by analyzing the reflected waves received by the transmitter-receiver 12.

The obstacle-detecting process as the second embodiment will be described with reference to FIG. 4. At step S210, the ultrasonic waves are transmitted backward. At step S220, data are sampled from reflected waves received by the transmitter-receiver 12 at a sampling interval $\Delta t$. At step S230, whether the number of sampled data has reached n is checked. If the number of the sampled data is equal to or higher than n, the process proceeds to step S240. Steps S220 and S230 are repeated until the number of sampled data reaches n. At step S240, a difference between the sampled data (n pieces of the newest data) and standard data consisting of n data is calculated in the following manner. The standard data consisting of n data (d1, d2 . . . dn) are shown in FIG. 5A, which are obtained by receiving ultrasonic waves reflected by the actually open tailgate 6. The sampling interval in obtaining the standard data is the same as $\Delta t$ used in the data sampling performed at step S220. A difference between each of the sampled data and each of the standard data is calculated, and an accumulated difference is obtained by summing up each difference.

Then, at the next step S250, whether the accumulated difference is equal to or smaller than a threshold difference THd is checked. If the accumulated difference is larger than the threshold difference THd, it is determined that the received waves are not those reflected by the open tailgate 6, i.e., the tailgate 6 is closed. The process proceeds to step S260, where whether a predetermined sampling period $\Delta Ta$ has lapsed after the transmission of ultrasonic waves is checked. If the sampling period $\Delta Ta$ has lapsed, the process proceeds to step S280, where the flag is reset (F=0). If the sampling period $\Delta Ta$ has not lapsed, the process returns to step S220 to repeat steps S220–S250. In this case, since the number of sampled data is already larger than n, the step S230 always delivers an affirmative answer. As shown in FIG. 5B, the sampling period $\Delta Ta$ is preset to include an entire waveform of the reflected waves from the tailgate 6.

If the accumulated difference is equal to or smaller than the threshold difference THd (at step S240), it is determined that the standard waveform and the waveform detected this time are substantially equal. This means that the waves are reflected from the tailgate 6 and therefore the tailgate 6 is actually open. Then, the process proceeds to step S270, where the flag is set (F=1).

After setting or resetting the flag at step S280 or S270, the process proceeds to step S140 to carry out steps S140–S200, which are the same as those of the first embodiment explained above.

In the second embodiment, the tailgate sensor 8 is not used. Instead, the waveform of the reflected waves is analyzed to determine whether the waves are reflected by the open tailgate or not. In this manner, without using the tailgate sensor 8, whether the tailgate 6 is opened or closed is detected. The steps S210–S230 and S260 in the process shown in FIG. 4 constitute first sampling steps in comparison with second sampling steps used in a third embodiment described below.

Figure 6:
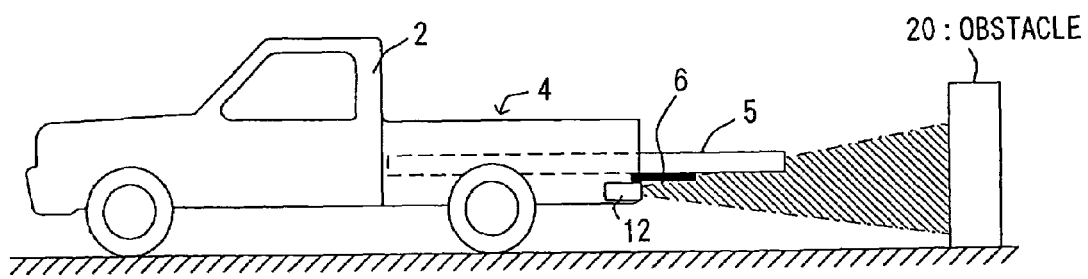
FIG. 6 is a side view showing a pickup truck on which an obstacle-detecting device of the present invention is mounted, wherein a load extends form a rear-most end of the open tailgate.
Figure 8:
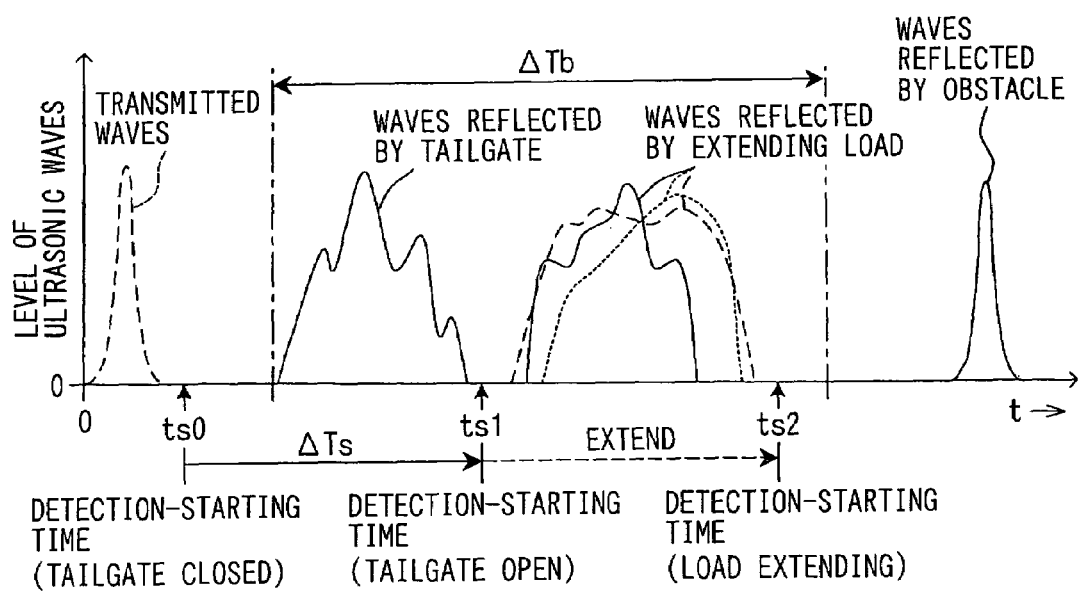
FIG. 8 is a timing chart showing a transmitted waves and reflected waves from the tailgate, the extending load and the obstacle in the obstacle-detecting process shown in FIG. 7.
Figure 7:
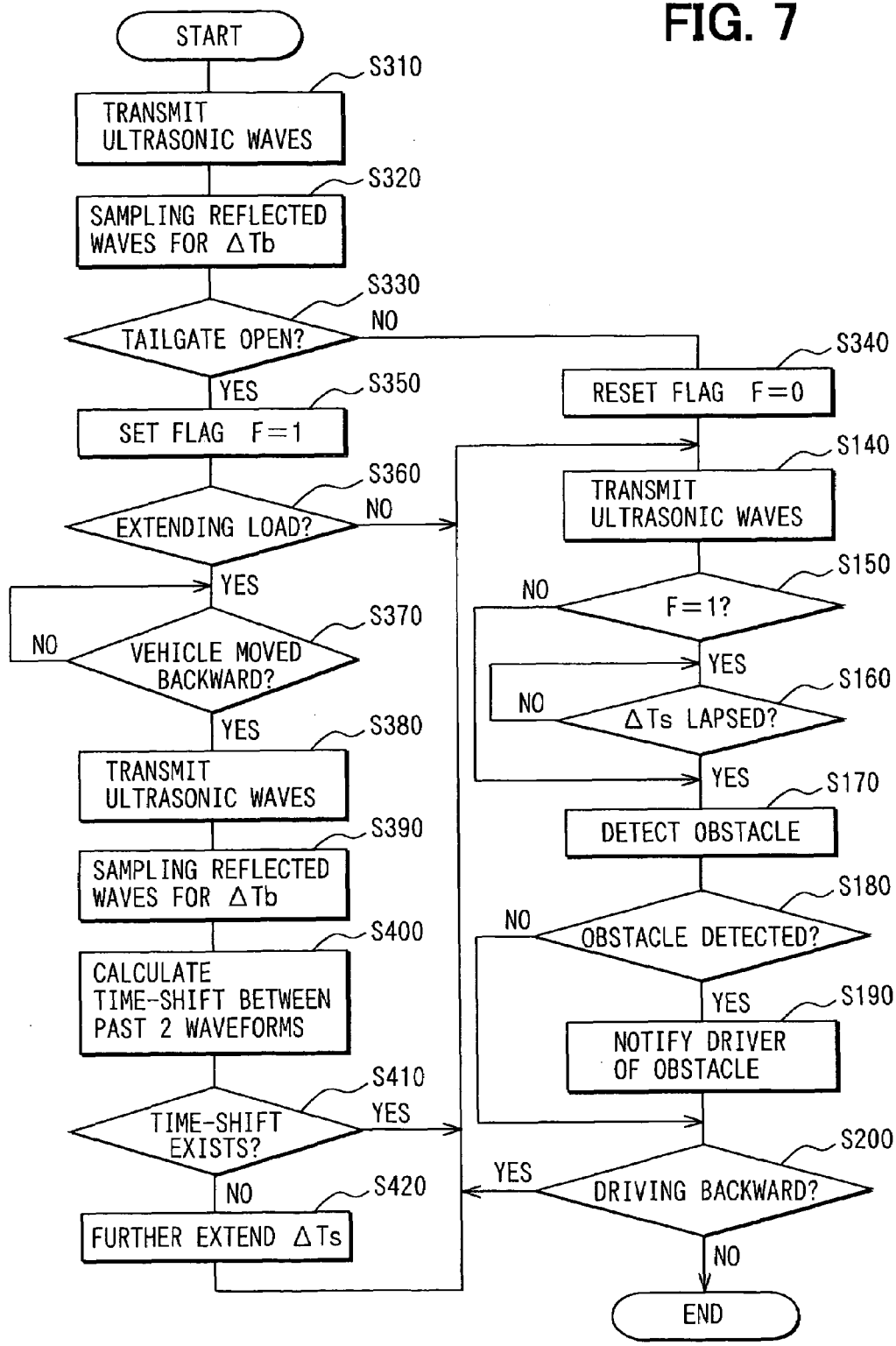
FIG. 7 is a flowchart showing a process of detecting a backward obstacle as a third embodiment of the present invention.

A third embodiment of the present invention will be described with reference to FIGS. 6–8. In this embodiment, the obstacle-detecting process is modified to cover a situation where an object 5 loaded on the loading space 4 extends from the rear-most end of the open tailgate 6, as shown in FIG. 6. The physical structures of the third embodiment are the same as those of the first embodiment shown in FIG. 1 except that the tailgate sensor 8 is eliminated. In the case where the load 5 extends from the rear-most end of the open tailgate 6, the ultrasonic waves transmitted will be reflected by the extending load 5. This may cause erroneous detection of the backward obstacle 20. As shown in FIG. 7, at step S310, ultrasonic waves are transmitted backward from the transmitter-receiver 12. At step S320, assuming that the load extends from the rear-most end of the tail gate 6, reflected waves are sampled for a predetermined sampling period $\Delta Tb$. As shown in FIG. 8, the sampling period $\Delta Tb$ is set to be able to receive all of the waves reflected form the extending load 5. The sampling is performed at a predetermined interval $\Delta t$. At step S330, a waveform of the reflected waves is compared with a pre-set standard waveform corresponding to waves reflected from the tailgate 6 when it is actually open. In comparing the reflected waveform with the standard waveform, the same method as used in the second embodiment may be used, or a correlation factor between the reflected waveform and the standard waveform may be calculated. If the waveform of the sampled data is not substantially equal to the standard waveform, it is determined that the tailgate 6 is not open, i.e., closed, and the process proceeds to step S340. At step S340, a flag is reset (F=0) to indicate that the tailgate 6 is closed. If it is determined that the tailgate 6 is open, the process proceeds to step S350, where the flag is set (F=1) to indicate that the tailgate 6 is open.

Then, at step S360, whether the load 5 is extending from the rear-most end of the tailgate 6 is determined by analyzing the sampled data obtained at step S320. If reflected waves having a level higher than a predetermined level are received from a region beyond the tailgate 6, it is determined that the load 5 extends from the tailgate 6. If it is determined that there is no extending load 5, the process directly proceeds to step S140. If it is determined that the load is extending, the process proceeds to step S370. At step S370, the process awaits a backward movement of the vehicle. When the vehicle is driven backward (even the movement is slight), the process proceeds to step S380, where the ultrasonic waves are transmitted backward from the transmitter-receiver 12. At the next step S390, the reflected waves are sampled for the sampling period $\Delta Tb$ at the sampling interval $\Delta t$ in the same manner as in step S320.

Then, at step S400, the reflected waveforms corresponding to the extending load 5 obtained at step S320 and at step S390 are compared with each other. At step S410, whether there is a substantial shift with respect to time (refer to the abscissa showing the time in FIG. 8) between both waveforms. If there is a substantial shift, it is determined that there is no extending load 5, and the process proceeds to step S140. If there is no substantial shift, it is determined that there is a load 5 extending from the rear-most end of the tailgate 6, and the process proceeds to step S420. At step S420, the predetermined delay period $\Delta Ts$ is extended up to time ts2 (refer to FIG. 8) to receive all of the reflected waves from the extending load 5 in the sampling period. Then, the process proceeds to step S140 to carry out the same series of steps S140–S200 as those in the first embodiment.

Referring to FIG. 8, the obstacle-detecting process as the third embodiment will be further explained. The ultrasonic transmission from the transmitter-receiver 12 is completed at time ts0. Reflected waves from the open tailgate 6 are received until time ts1, and reflected waves from the extending load 5 are received from time ts1 to time ts2 if there is the extending load. The data corresponding to those reflected waves are sampled for the predetermined sampling period $\Delta Tb$ at the sampling interval $\Delta t$. Whether the tailgate 6 is open or not and whether there is an object beyond the open tailgate 6 are determined by analyzing waveforms corresponding to the reflected waves.

When it is determined that there is an object beyond the open tailgate, the vehicle is driven backward and data sampling is carried out again. Then, a first waveform corresponding to the sampled data before the vehicle is driven backward is compared with a second waveform corresponding to the sampled data taken after the vehicle is driven backward. If both waveforms are substantially identical, it is determined that the backward object is the extending load 5, and the delay period $\Delta Ts$ is extended to time ts2 so that the time point for detecting the backward obstacle 20 starts at time ts2. Then, reflected waves from the backward obstacle 20 are received by the transmitter-receiver 12. Thus, it is avoided that the reflected waves from the extending load 5 are erroneously considered as those from the backward obstacle 20. In this third embodiment, steps S310 and S320 constitute first sampling means, steps S380 and S390 constitute second sampling means, steps S400 and S410 constitute means for detecting the extending load, and S420 constitutes means for extending the delay period.

The present invention is not limited to the embodiments described above, but it may be variously modified. For example, in the third embodiment, whether the tailgate 6 is open or not may be detected by the tailgate sensor 8 as done in the first embodiment. In this case, however, steps S380 and S390 have to be performed at least twice (before and after a backward drive of the vehicle) to detect the shift between two waveforms at step S400. That is, in the third embodiment described above, the sampling period ΔTb is set to an equal period in step S320 and step S390. Therefore, the shift of two waveforms can be detected by performing data sampling once at step S390. If the state of the tailgate 6 is detected by using the tailgate sensor 8, it is not possible to set the equal sampling period. Accordingly, the second sampling at steps S380 and S390 have to be performed at least twice. Though the ultrasonic waves are used in detecting the backward obstacle in the foregoing embodiments, other electromagnetic waves may be used.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A device for detecting an obstacle located backward of an automobile that has a loading space at a rear side thereof and a tailgate for closing the loading space, the detecting device comprising:
    a transmitter-receiver, positioned at a rear end of the automobile, for transmitting backward ultrasonic or electromagnetic waves and for receiving the waves reflected by the obstacle located backward of the automobile;
    a control unit for operating the transmitter-receiver when the automobile is driven backward and for detecting the waves reflected from the obstacle, such detection being started at a detection-starting time;
    means for determining that the obstacle is located backward of the automobile when a level of the reflected waves is higher than a predetermined level;
    tailgate-detecting means for detecting whether the tailgate is open or closed; and
    means for delaying the detection-starting time when the tailgate is open with respect to the detection-starting time applicable when the tailgate is closed.

2. The detecting device as in claim 1, wherein
the tailgate-detecting means includes: a first sampling means for sampling the reflected waves for a first sampling period corresponding to a predetermined period in which the waves are normally reflected from the tailgate when it is open; and first comparing means for comparing a waveform of the reflected waves with a standard waveform corresponding to the reflected waves from the tailgate when it is open and for determining that the tailgate is open if both waveforms are substantially identical and that the tailgate is closed if both waveforms are not substantially identical.

3. The detecting device as in claim 2, wherein:
the tailgate-detecting means further includes: second sampling means for sampling the reflected waves for a second sampling period corresponding to a predetermined period in which the waves are normally reflected from a load loaded on the loading space and extending backward from a rear-most end of the tailgate when it is open, the second sampling means sampling again the reflected waves for the same second sampling period after it is determined that the tailgate is open and the automobile is driven backward; and second comparing means for comparing waveforms corresponding to the reflected waves sampled before and after the vehicle is driven and for determining that there exists the load extending from the rear-most end of the tailgate if a shift with respect to time is detected between both waveforms; and
the delaying means further delays the detection-starting time by a predetermined period when there exists the extending load.

4. A method of detecting an obstacle located backward of an automobile that has a loading space at a rear side thereof and a tailgate for closing the loading space, the method comprising:
    transmitting ultrasonic waves backward of the automobile;
    detecting whether the tailgate is open or closed;
    receiving the ultrasonic waves reflected from the backward obstacle; and
    detecting the backward obstacle based on the reflected ultrasonic waves received, wherein:
    a time for starting the detection of the backward obstacle is delayed when the tailgate is open with respect to when the tailgate is closed to thereby avoid erroneous detection of the backward obstacle based on the reflected waves from the open tailgate.

5. The method of detecting an obstacle as in claim 4, wherein:
    in the step of detecting whether the tailgate is open or closed, a waveform corresponding to the reflected waves that is received is compared with a standard waveform corresponding to the reflected waves from the open tailgate, and it is determined that the tailgate is open if both waveforms are substantially identical.

6. The method of detecting an obstacle as in claim 4, further including a step of determining whether a load loaded in the loading space further extends backward from a rear-most end of the open tailgate, wherein the time of starting the detection of the backward obstacle is further delayed when the load extends backward from the open tailgate with respect to when the tailgate is open and no load extends therefrom.

* * * * *